United States Patent [19]
Murtin

[11] 3,732,854
[45] May 15, 1973

[54] INJECTION-CONTROL SYSTEM FOR INTERNAL-COMBUSTION ENGINE

[75] Inventor: Fernand R. C. Murtin, Paris, France

[73] Assignee: Societe Industrielle d'Electronique et d'Informatique, Paris, France

[22] Filed: Apr. 2, 1971

[21] Appl. No.: 130,615

[30] Foreign Application Priority Data

Apr. 2, 1970 France..................................7011990
June 2, 1970 France..................................7020116

[52] U.S. Cl..............123/32 EA, 73/194, 123/139 E, 123/32 R
[51] Int. Cl. .............................F02b 3/00, G01f 1/00
[58] Field of Search........................123/32 E, 32 EA; 73/194, 181, 88.5

[56] References Cited

UNITED STATES PATENTS

| | | | |
|---|---|---|---|
| 3,470,741 | 10/1969 | Durbin | 73/181 |
| 3,470,858 | 10/1969 | Mycroft | 123/119 |
| 1,319,718 | 10/1919 | Martin | 123/119 |
| 1,835,615 | 12/1931 | Robert | 123/119 |
| 3,188,862 | 6/1965 | Roth | 73/88.5 |
| 3,456,628 | 7/1969 | Bassot | 123/32 |
| 1,872,673 | 8/1932 | Carpentper | 123/32 |

Primary Examiner—Laurence M. Goodridge
Assistant Examiner—Ronald B. Cox
Attorney—Karl F. Ross

[57] ABSTRACT

To maintain optimum air-fuel ratio in a cylinder of an internal-combustion engine, the operating time of a fuel injector is controlled by a logic network responding to engine speed, temperature and load as determined by respective sensors. Engine speed is measured by a pulse generator, synchronized with the engine, whose pulses are fed to a spark plug in the cylinder, to a timing circuit in the logic network and to an ionization-type flow meter in the air-intake manifold. The output of the flow meter, integrated over a number of cycles, is applied to one input of a comparator via a circuit including a thermistor which serves as a temperature sensor, the other input of the comparator receiving a progressively rising reference voltage from a timing condenser which is charged from a constant-current source. The timing circuit includes a flip-flop, periodically set by a pulse from the generator, which is reset by the comparator whenever the condenser potential reaches the output voltage of the sensing circuit and which thereupon discharges the condenser, keeping it from recharging until the arrival of the next pulse. The flip-flop, when set, actuates the fuel injector by overlappingly energizing a biasing winding and a working winding thereof.

14 Claims, 5 Drawing Figures

Fernand R.C. Murtin
INVENTOR.

BY Karl F. Ross
Attorney

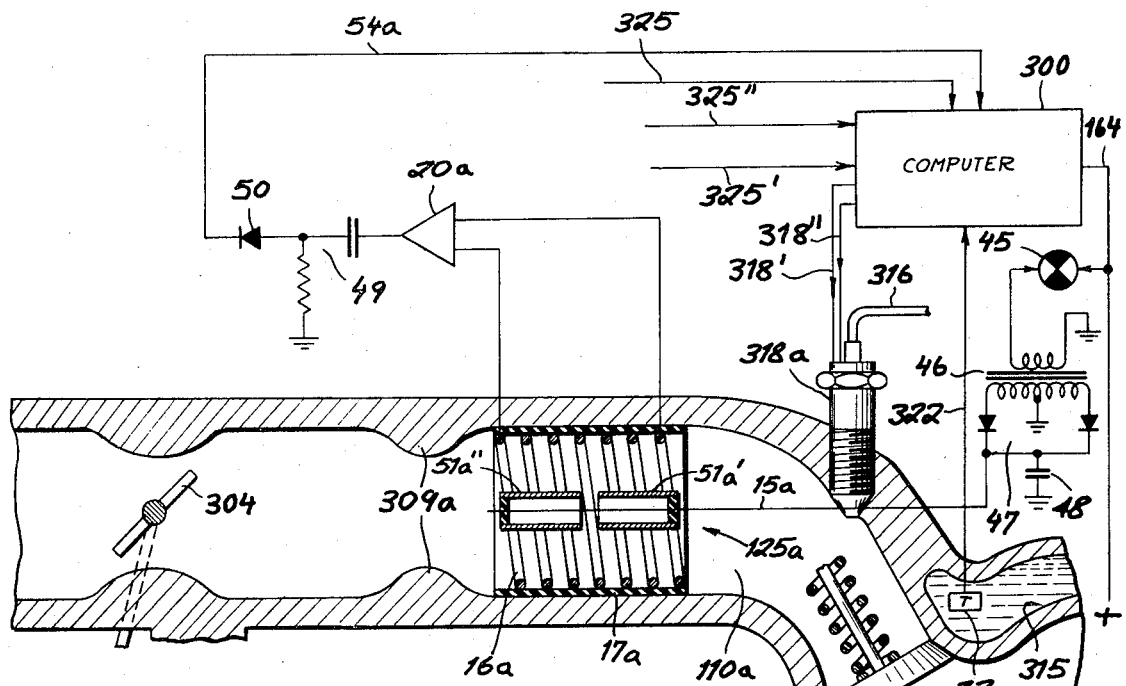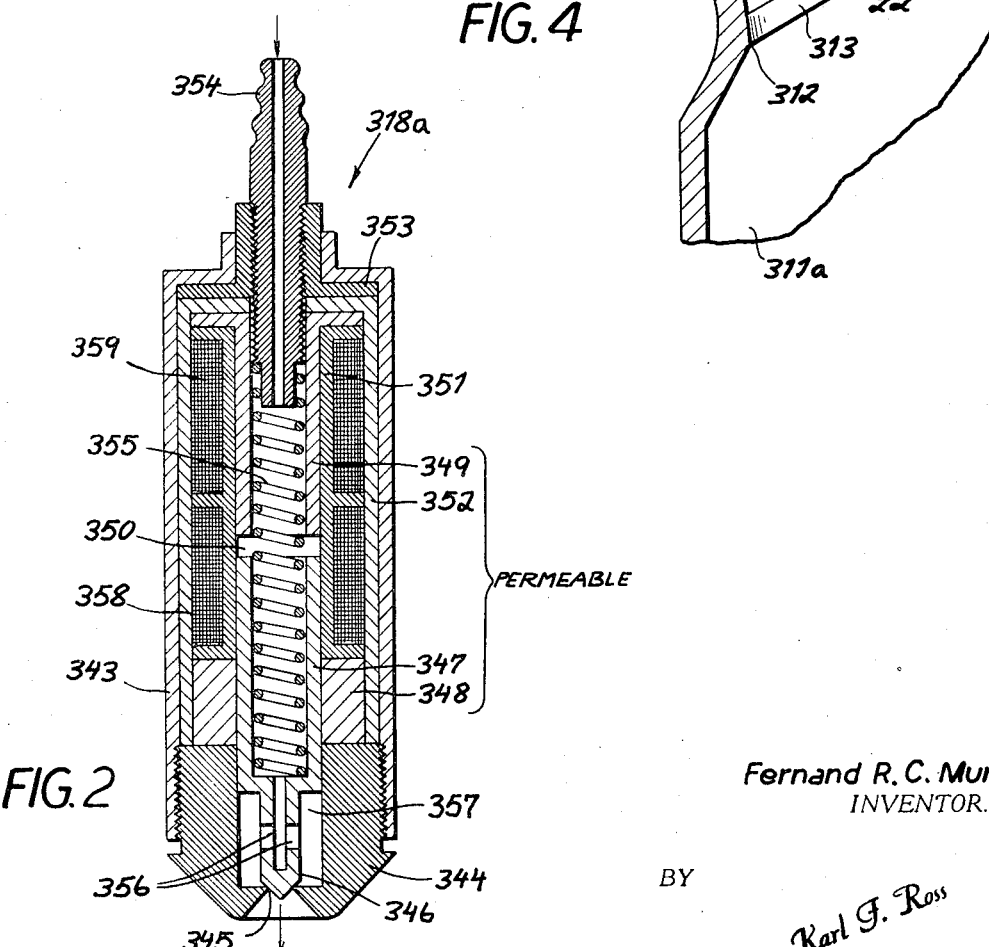

INVENTOR:
Fernand R. C. Murtin
BY
Karl F. Ross
Attorney

INJECTION-CONTROL SYSTEM FOR INTERNAL-COMBUSTION ENGINE

My present invention relates to an injection-control system for an internal-combustion engine deriving its energy from the burning of an inflammable mixture of a volatile fuel with air. The invention, although not so limited, is especially applicable to spark-ignition engines for automotive vehicles.

An electronically controlled fuel-injection system for such engines has been disclosed in commonly owned application Ser. No. 7,781, filed by me jointly with Loic Mercier on 2 Feb. 1970 and now replaced by application Ser. No. 235,289 filed 16 Mar. 1972 as a continuation-in-part thereof. In that system, the duration of fuel injection into the combustion chamber of an engine cylinder is determined by a succession of signals from a logic network responding to several parameters such as engine speed, temperature and the air pressure or flow rate in the intake manifold feeding the cylinders. Engine speed is measured by a pulse generator including a permanent magnet on an engine-driven shaft and an electromagnetic pick-up coil juxtaposed with that shaft for periodic excitation by the magnet. As more fully disclosed in commonly owned application Ser. No. 36,814, filed by me jointly with Loic Mercier and Jean Barat on 13 May 1970, a number of coils equal to that of the engine cylinders (e.g., four) may be angularly equispaced about the driven shaft for consecutive energization to initiate a succession of interleaved operating cycles for the corresponding pistons. With such an operating cycle, fuel injection into the common intake manifold may take place just before the opening of an inlet valve of a cylinder at the beginning of a suction stroke.

The general object of my present invention is to provide an improved control system for the purpose of correlating the rate of fuel injection with the significant input parameters, particularly engine speed and load, with maintenance of the optimum air fuel ratio to insure complete combustion with virtually no unburned residue which would pollute the atmosphere and detract from the thermal efficiency of the engine.

A more specific object is to provide a system of this character which more accurately times the duration of an injection period in response to engine load. I have found that, aside from cylinder temperature which needs to be taken into account especially during the starting of a cold engine, a single parameter fully determines the necessary duration of an injection period within an operating cycle, this one parameter being the mass flow of air in the intake manifold. With the accelerator-controlled throttle valve in a given position, this mass-flow rate is a linear function of the engine speed which, incidentally, varies only in a relatively narrow range. As the pedal is depressed with increased engine load to open the throttle valve wider, a larger amount of air is aspirated into the cylinder during each suction stroke of its piston so that more fuel can be burned to deliver the required energy. As the load diminishes and the air influx is restricted, the fuel supply must be reduced to prevent the discharge of unburned hydrocarbons.

Thus, an important feature of my invention resides in the provision of an electronic flow meter in an air-intake duct leading into the combustion chamber whose fuel supply is to be controlled, such as the intake manifold of a multicylinder engine. A timer, responding to an output signal from the flow meter and to pulses from the above-described electromagnetic pulse generator, or of some equivalent pulse source having an operating frequency proportional to engine speed, establishes a variable feeding period for a fuel injector opening into that duct; during that feeding period, fuel reaches the duct through the injector in vaporized form from a dosing pump maintaining a substantially constant vapor pressure whereby the amount of fuel admitted during each cycle is proportional to the massflow rate of the combustion air. During idling, i.e., with the throttle valve nearly closed, this mass-flow rate and therefore the quantity of injected fuel will be a minimum; at high loads (e.g., during acceleration or uphill driving), with the throttle valve wide open, that quantity will increase to a value commensurate with the amount of aspirated air (preferably averaged over a few cycles) so that, inasmuch as the number of cycles per unit of time is proportional to engine speed, the absolute feed rate is a function of both speed and accelerator position. Generally, of course, the engine will be coupled with the traction wheels of the vehicle through a conventional automatic or manual transmission of variable speed ratio wherefore there is no direct relationship between fuel consumption and vehicular velocity.

An electronic mass-flow meter, capable of measuring the air flow in the intake manifold, may include a first electrode centrally positioned within the duct and a second electrode disposed along the peripheral wall thereof, the two electrodes being subjected to a voltage difference sufficient to ionize the intervening air column whereby the more negative electrode (cathode) intercepts a stream of ions generated at the more positive electrode (anode) at a rate determined by the density of the air mass and its motion relative to the electrodes. If one of these electrodes (advantageously the cathode) is split into two portions spaced apart in the direction of air flow, i.e., an upstream and a downstream portion, the difference in ion flow directed toward these portions gives rise to two unequal currents in a circuit differentially connected across the two portions so as to produce a signal which measures the mass-flow rate. Such an ionization-type flow meter has been disclosed in U.S. Pat. No. 3,470,741 granted to Enoch J. Durbin.

Still another feature of my invention relates to the construction of the ion source in the mass-flow meter. I have found that, for more efficient ionization, the centrally positioned anode should have the form of an elongate corona wire spacedly surrounded by a pair of conductive tubes with are axially separated at or near the center of the electrode structure to form a gap about a wire section of limited axial length for the release of the accumulated ions toward the enveloping cathode. The tubes, which are connected to ground or another point of fixed potential through a very high leakage resistance (e.g., on the order of $10^{10}$ ohms), act as secondary anodes by quickly charging to almost the potential of the anode wire through the exchange of electrons and cations with that wire. Thus, there develops within each tube an ion cloud which is attracted toward the gap by the negative potential of the cathode and which, upon emerging, drifts axially with the surrounding air mass before being absorbed by the cathode.

The length of the sheathed wire extremities is not critical; in practice, the anode structure may be axially coextensive with or even longer than the enveloping cathode. The inner and outer tube diameters should be many times larger than the wire diameter, e.g., between 10,000 and 100,000 times as large, in order not to create a corona effect around the secondary anodes when the wire is raised to the ionizing potential.

In accordance with a more specific feature of my present invention, the ionization electrode (anode) of such a flow-measuring device is periodically energized to generate a train of short metering pulses in the differentially connected output circuit, the ionizing pulses being preferably derived from the same source as the ignition pulses for the spark plugs of the engine cylinders, i.e., from a step-up transformer connected across the engine-controlled pulse generator. The resulting metering pulses are then integrated to provide a control voltage for a comparator which also receives a progressively varying reference voltage and which, upon detecting a match between these voltages, restores a bistable multivibrator or flip-flop previously tripped by a timing pulse from the pulse generator. Thus, the time measured by the flip-flop in its tripped or "set" condition is a function of the mass flow of air as detected by the above-described flow meter; this function may be modified by a thermosensitive resistance which responds to the temperature of the engine in the vicinity of the associated combustion chamber and is included in the connection between the pulse integrator and the comparator. The injector, which may be of the two-stage type disclosed in application Ser. No. 7,781 and more fully described hereinafter, is actuated in the set condition of the flip-flop, it being understood that several injectors associated with different cylinders can be operated in like manner and in staggered relationship by respective flip-flops and individual comparators responding to the integrated output of a common flow meter.

Pursuant to a further feature of my invention, the pulse generator synchronized with the engine may comprise a continuously energized flow meter of the type described above which is disposed at the entrance of an individual cylinder to produce an output voltage varying with the pulsating air flow into the cylinder. This output voltage may be converted, e.g., by differentiation and rectification in a manner well known per se, into a train of timing pulses synchronized with the reciprocation of the associated piston.

The above and other features of my invention will be described in detail hereinafter with reference to the accompanying drawing in which:

FIG. 2 is a cross-sectional view of a fuel injector included in the system of FIG. 1;

FIG. 4 is a view similar to FIG. 1, showing a modification; and

Figure 1:
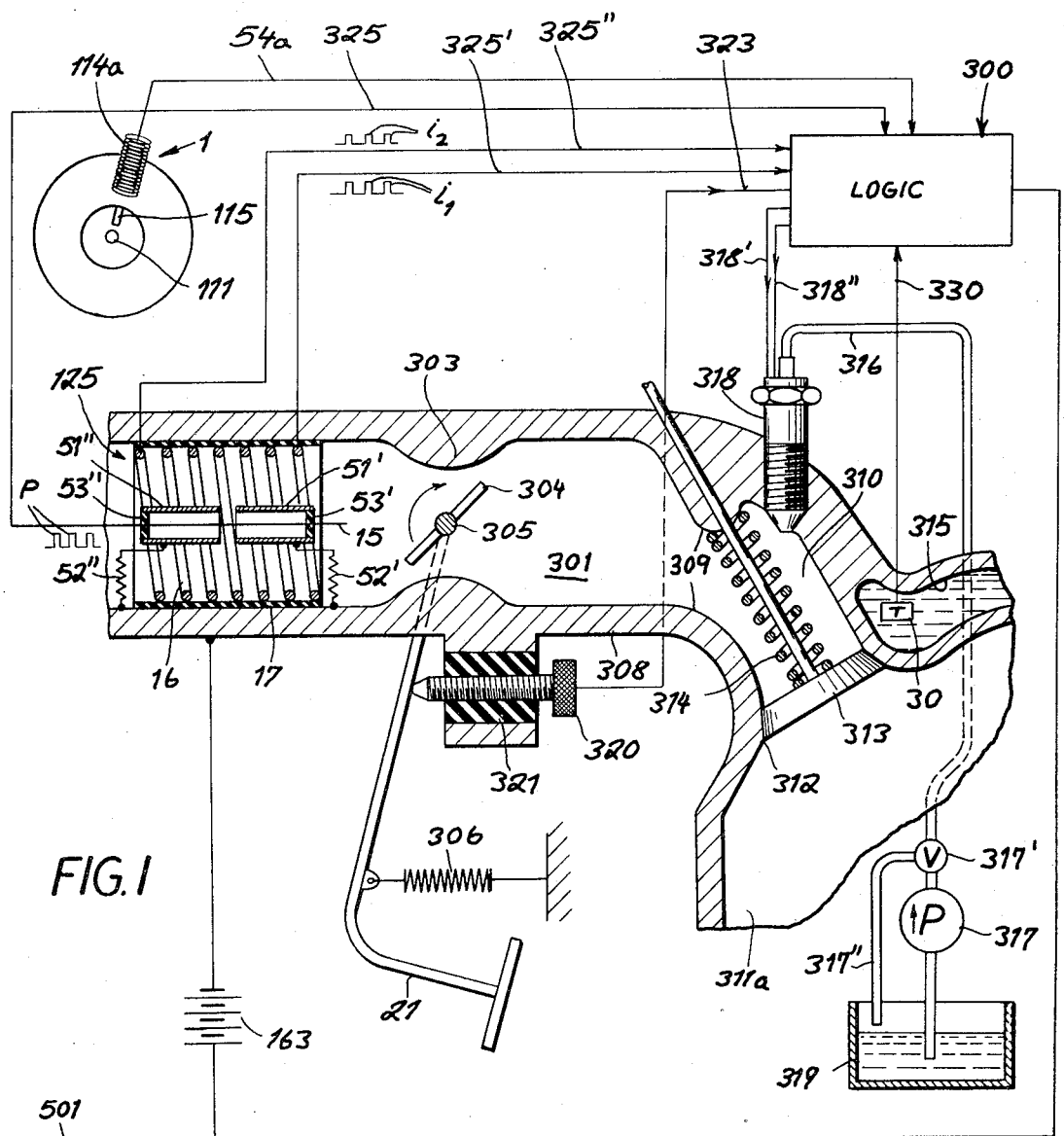
FIG. 1 is a somewhat diagrammatic view of part of a gasoline engine provided with my improved injection-control system.

In the ensuing description, many elements having counterparts in applications Ser. Nos. 7,781 and 235,289 will be designated by the same reference numerals.

The internal-combustion engine partly shown in FIG. 1 serves to drive an automotive vehicle i the conventional manner. The driver's seat of the vehicle is equipped with the usual accelerator pedal 21 which can be depressed against the force of a spring 306 and is mechanically linked with a gudgeon 305 of a butterfly-type throttle valve or damper 304 situated in a constricted part 303 of an intake manifold 301 communicating with the atmosphere through a port 302. Pedal 21 is electrically grounded through its contact with the metallic manifold housing 308. Manifold 301 serves a group of combustion cylinders one of which is partly shown at 311a; a neck portion 310 of that cylinder opens into the manifold through a further constriction 309. A poppet valve 313, conventionally biased into a closure position by a contractile spring 314, separates the combustion space of cylinder 311a from the neck 310; this valve is periodically opened by an engine-driven cam shaft as is well known per se. A shaft 111, which may be an extension of that cam shaft or may be positively coupled therewith, carries a permanent magnet 115 moving once per revolution past an electromagnetic pickup coil 114a which is one of several such coils, one per cylinder, peripherally equispaced about the shaft 111. Coil 114a has an output lead 54a terminating at a logic network 300 which also receives, via a conductor 330, a signal from a temperature sensor 30 disposed in a cooling channel 315 within the cylinder wall through which water cooled by the radiator of the engine is circulated; in the case of an air-cooled engine, this temperature feeler may be mounted in direct contact with the cylinder wall. It will be understood that the remaining cylinders have neck portions branched off the manifold 301 via constrictions similar to that shown at 309.

A fuel injector 318a is connected via a supply conduit 316 to the high-pressure side of a constant-pressure fuel pump 317 whose output is regulated by a spring-loaded valve 317' calibrated to open a bypass 317' to a fuel reservoir 319 whenever the delivery pressure of the pump rises above the prescribed level. Injector 318a is controlled, in a manner more fully described hereinafter with reference to FIGS. 2 and 3, by way of a pair of input leads 318', 318" emanating from network 300.

With the throttle valve 304 in a position of near closure, corresponding to idling of the engine under low-load conditions, pedal 21 comes to rest against an adjustable back-stop in the form of a screw 320 seated in an insulated bushing on housing 308. A conductor 323, leading from screw 320 to network 300, is therefore grounded whenever the pedal is in its illustrated retracted position.

Figure 3:
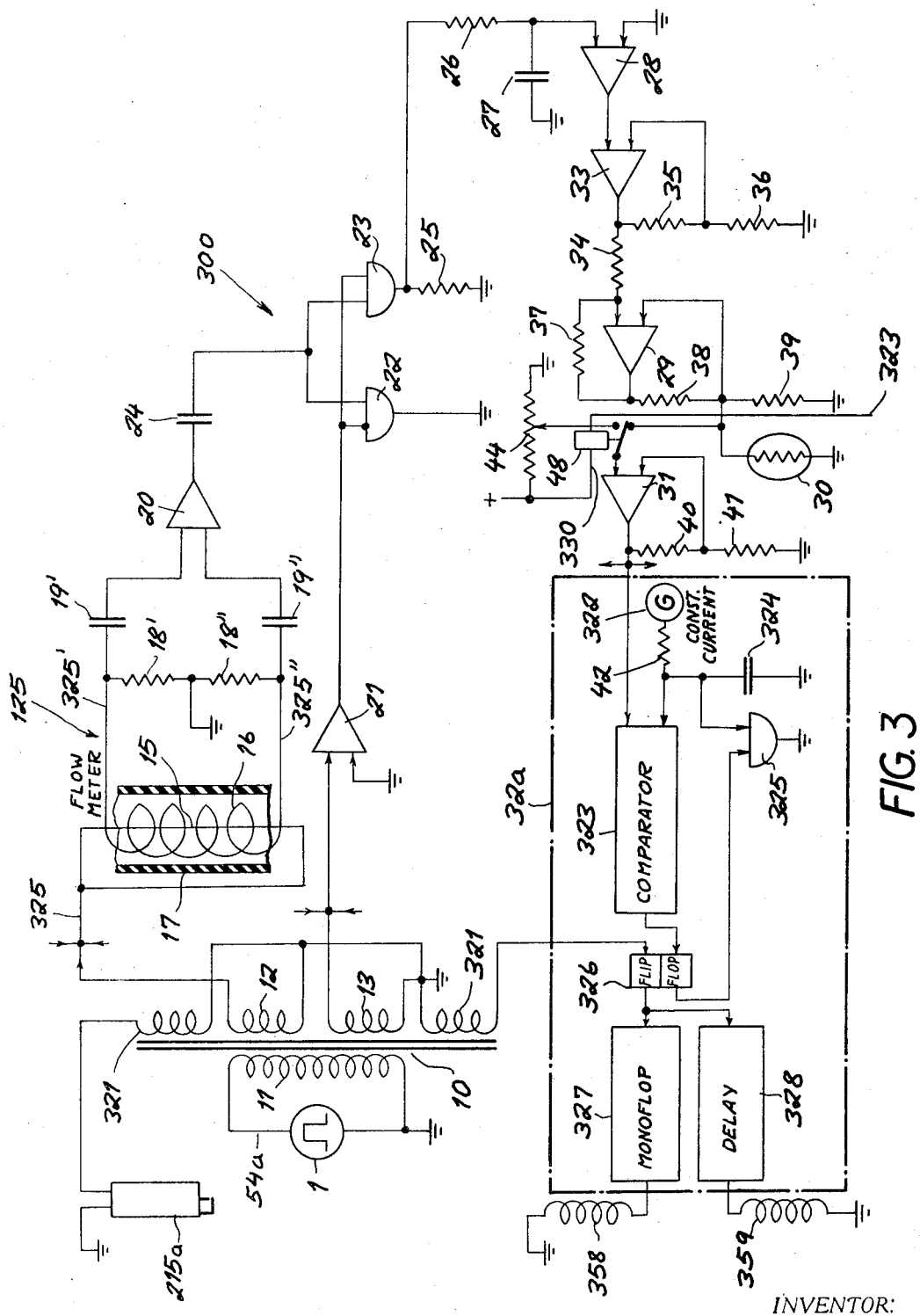
FIG. 3 is a circuit diagram of a logic network and other components forming part of the system.

The active circuit elements of network 300, described hereinafter with reference to FIG. 3, are powered from the vehicular battery 163 by way of a bus bar 164.

An electronic flow-measuring device, generally designated 125, is disposed in the manifold 301 between its inlet port 302 and the throttle valve 304. This device, is an ionization gauge generally similar to that shown in FIG. 11 of the above-identified Durbin patent but differing from it in that its rod-shaped anode 15, co-axially mounted inside the manifold, is surrounded by a pair of axially spaced conductive tubes 51', 51" which are grounded through very high resistances 52', 52" to generate an electron cloud issuing from the intervening gap upon the application of a high positive potential thereto, e.g., of 10,000 to 20,000 volts. A helically wound cathode 16 of resistance material, with spaced-apart turns, lines the peripheral wall 301 and is separated therefrom by an insulating layer 17; the turns of this cathode are positioned partly upstream and partly downstream with reference to the anode gap. The downstream and upstream extremities of the helix 16 are connected to logic network 300 by way of respective leads 325′, 325″ carrying respective trains of current pulses $i_1$, $i_2$.

The leakage resistances 52′, 52″ may be physically embodied in struts of high-resistance material supporting the tubes 51′, 51″ on the manifold wall 308. The outer ends of the tubes are shown enclosed by dielectric plates 53′, 53″ serving to hold the wire 15 in coaxial position.

FIG. 2 shows a preferred construction of the injector 318a. A cylindrical housing 343 of nonmagnetic material threadedly engages a nozzle 344 whose outlet 345 is normally closed by a beveled tip 346 of a tubular armature 347 of magnetically permeable material which is slidably guided in a similarly permeable ring 348. Another tubular member 349 of permeable material, confronting the armature 347 across an air gap 350, is fixedly clamped within housing 343 through the intermediary of ring 348, a tubular winding support 351 enclosing the members 347 and 349, a ferromagnetic shell 352 embracing the ring 348 and the support 351, and an internally threaded insert 353 projecting from the housing end opposite nozzle 344. A nipple 354 is screwed into insert 353 and forms an abutment for a compression spring 355 received within members 349 and 347, this spring tending to urge the tip 346 against its seat 345. A fluid path for fuel entering the bore of nipple 354 extends through the spring chamber within members 347 and 349 and through a pair of lateral orifices 356 in tip 346 to a space 357 surrounding that tip, this space being open toward the outside upon a withdrawal of tip 346 from nozzle mouth 345.

A magnetic circuit, interrupted by the air gap 350, will thus be seen to include the elements 347, 348, 349 and 352, this circuit being formed around a pair of annular clearances which receive two electromagnetic coils 358, 359 carried on support 351. As described hereinafter with reference to FIG. 3, windings 358 and 359 are sequentially energized in staggered relationship and are aidingly interconnected so that their joint excitation opens the injection valve represented by armature tip 346 and nozzle mouth 345. The preliminary energization of biasing winding 358, insufficient in itself to displace the armature 347 against the force of spring 355, generates enough flux to shift the operating point of the electromagnetic circuit to the linear portion of its hysteresis curve whereby the valve opens promptly upon the subsequent energization of the working winding 359. Toward the end of the injection interval, biasing winding 358 is de-energized (preferably after having been energized for a fixed period) but the remanence of the ferromagnetic elements, together with the continuing current flow in winding 359, holds the armature 347 retracted while again establishing an operating point on the linear portion of the hysteresis curve. Upon the de-energization of winding 359, after a variable period depending upon the controlling parameters, spring 355 quickly returns the armature to its closure position.

FIG. 3 shows details of the logic network 300 together with the pulse generator 1, the flow meter 125 and the injector coils 358, 359 of the preceeding Figures. Pulse generator 1 works into the primary winding 11 of a voltage-step-up transformer 10 having four secondary windings 12, 13, 315 and 321. Winding 12 is connected to the anode wire 15 of flow meter 125 by way of the lead 325 which is split into two branches for symmetrical energization of that wire within sleeve 17; the surrounding sleeves 51′, 51″ (FIG. 1) have been omitted in this diagram. Cathode 16 is connected, via leads 325′ and 325″, to ground by way of two identical resistors 18′, 18″, these leads being further joined to corresponding inputs of a differential a-c amplifier 20 through respective coupling condensers 19′, 19″. The output of amplifier 20 is applied through a further condenser 24 to one input each of a pair of coincidence gates 22, 23 of the analog type, an inverting input of gate 22 and a noninverting input of gate 23 being connected in parallel to the high-voltage terminal of winding 13 via an amplifier and pulse shaper 21. The output of gate 22 is grounded whereas that of gate 23 is connected to ground through a resistor 25 and, in parallel therewith, to an input of an operational amplifier 28 through a resistor 26; this input of amplifier 28 is also connected to ground through a condenser 27 constituting with resistor 26 an integrating circuit with a time constant substantially greater than an operating cycle of pulse generator 1 (i.e., a revolution of shaft 111 in FIG. 1).

Amplifier 28 drives, by way of a further amplifying stage 33 and associated resistors 34, 35, 36, a power amplifier 29 provided with a pair of feedback resistors 37, 38 respectively connecting the output of that amplifier to a noninverting and to an inverting input thereof; the latter input is tied to lead 330 (cf. FIG. 1) and is grounded through a fixed resistor 39 in parallel with a negative thermistor 30 representing the similarly designated temperature sensor of FIG. 1. Lead 330 terminates at an operational amplifier 31 whose output lead 320, grounded through a voltage divider 40, 41 which forms part of a negative-feedback connection, extends to one input of a comparator 323 in a processor 32a. The second input of comparator 323 is connected to the ungrounded terminal of a grounded storage capacitor 324, this terminal being continuously energized from a constant-current generator 322 through a charging resistor 42. An analog gate 325, having one input tied to the same terminal, shunts the capacitor 324 and has another input connected to the reset output of a flip-flop 326 whose setting input is periodically pulsed by the transformer winding 321 and whose resetting input is fed by the comparator 323 whenever the charging potential of capacitor 324 matches the output voltage of amplifier 31 as developed across resistors 40 and 41.

The set output of flip-flop 326 feeds a monostable multivibrator or monoflop 327 and, in parallel therewith, a delay circuit 328. Monoflop 327, when triggered by the set flip-flop 326, energizes (via lead 318′) the injector winding 358a for a short period which corresponds with the instability interval of the monoflop and slightly exceeds the delay time of circuit 328. The latter circuit, via lead 318″, energizes the injector 359 for a length of time equaling the set period of flip-flop 326, i.e., the interval between the energization of secondary 321 by a pulse from generator 1 and the operation of comparator 323 in response to equality of its two input voltages. Upon such operation, the reset flip-flop 326 opens the analog gate 325 to short-circuit the capacitor 324 which therefore does not begin to recharge until the arrival of the next setting pulses from winding 321. Thus, the potential of this capacitor is a sawtooth voltage with an interruption between the end of one tooth and the rising flank of the next.

In operation, amplifier 21 has no output between pulses from generator 1 so that gate 22 is open and grounds the condenser 24. Upon the energization of transformer 10, the pulsating ion flow to the several turns of helix 16 generates a momentary potential difference across the inputs of amplifier 20 which is translated into an amplified metering pulse developed across resistor 25 inasmuch as gate 22 is blocked and gate 23 is unblocked at that very moment by the conduction of amplifier 21. The integrated value of these metering pulses is fed by circuit 26, 27 and amplifiers 28 and 33 to amplifier 29 and results in a proportional current flow in the output of amplifier 29; since the resistance of thermistor 30 varies inversely with engine temperature, the voltage on lead 320 is directly proportional to engine speed and mass-flow rate (thus also to the load) but inversely proportional to engine temperature. Inasmuch as the comparator 323 does not reset the flip-flop 326 until the rising sawtooth voltage on condenser 324 reaches the level of energization of lead 320, the duration of the injection period is a linear function of the output voltage of amplifier 31.

This duration satisfies, therefore, the expression $$t + KQ\,[1+\gamma(T_o-T)]$$

where $Q$ is the quantity of combustion air aspirated in unit time (as averaged over a number of cycles), $T_o$ is the normal operating temperature of the cylinder, $T$ is the actual cylinder temperature and $K$, $\gamma$ are constants depending on the construction of the engine.

The wire 323, which is grounded in the retracted position of pedal 21 (FIG. 1), is shown connected to a relay 43 whose armature, upon its energization, switches the lead 330 from the output of amplifier 29 to a preferably adjustable tap on a potentiometer 44 whereby a low voltage of predetermined magnitude is fed to the comparator 323 in lieu of the flow-controlled and temperature-dependent signal voltage normally applied thereto. At minimum load, therefore, the injector 318a (FIGS. 1 and 2) is actuated only for a fixed, brief period during each engine cycle.

The energization of flow meter 125 via transformer winding 12 coincides with the firing of a spark plug 215a in cylinder 311a (FIG. 1), this spark plug being connected across winding 321. It will be understood that with a four-cylinder engine, for example, generator 1 will have four outputs such as lead 54a from respective pick-up coils such as coil 114a each energizing its own transformer 10, the windings 12 of these transformers working jointly into anode lead 325 of flow meter 125 while their windings 321 fire respective spark plugs. A control circuit such as processor 32a for the corresponding injector will then receive the output of amplifier 31 in parallel with three similar circuits assigned to the other three cylinders and connected to the windings 321 of respective transformers 10 whose windings 13 work in parallel into the pulse amplifier and shaper 21.

The pulse generator 1, powered by an output shaft directly driven by the engine, is representative of a variety of pulse sources whose operating frequency or cadence is synchronized with the engine in any suitable manner. Thus it will be readily understood that such a pulse generator could also be mechanically actuated by the cam shaft of the engine or could be controlled by the pulsating air flow in manifold 301. The latter possibility has been illustrated in FIG. 4 where a flow meter 125a, located in an extended neck portion 110a of cylinder 311a, is generally similar to meter 125 but has its anode wire 15a continuously energized from a source of high d-c voltage here shown as comprising a circuit breaker 45 (e.g., a self-interrupting relay) connected to positive lead 164, a step-up transformer 46 and a rectification network 47 with smoothing condenser 48. The helicoidal cathode 16a, separated from the housing wall by an insulating layer 17a, works into a differential amplifier 20a whose output, differentiated in a circuit 49 and rectified by a diode 50, periodically energizes the input lead 54a of logic network 300. The axially spaced anode sleeves, grounded through high-ohmic resistors not shown, have been designated $51a'$, $51a''$.

The aforedescribed mass-flow meter effectively measures the product of air density and air velocity, yet the first of these factors is normally subject to only minor variations due to changes in atmospheric pressure. Thus, in a given vehicle not destined for traveling at widely different altitudes, the density factor may be considered a constant. On the other hand, the composition of the air may be altered significantly as the vehicle travels in open country, in urban traffic or through a tunnel. With oxygen more readily ionizable than $CO_2$, for example, an enrichment of the air in the intake manifold with such an added component may simulate a change in density indicative of a greater quantity of combustion air than is actually present.

To remedy this inconvenience, a further feature of my invention contemplates the use of two cascaded ionizationtype flow meters, such as those shown at 125 and 125a in FIGS. 1 and 4, which may be located on either side of the throttle valve 304 or on opposite sides thereof; the air stream traversing the first flow meter also passes, in its entirety or in part, through the second flow meter, depending on whether the latter is located in the main part of the manifold or in the inlet of an individual cylinder. One of these cascaded flow meters has its anode energized, continuously or intermittently, by a source of constant voltage whereas the anode of the other flow meter is connected with a source of constant current.

In the case of constant-current energization, the voltage $V$ developed across the electrodes of the flow meter is a function $qI_o$ of the constant supply current $I_o$, $q$ being a variable which has the character of a resistance and depends on such features as overall density, rate of ionization and ion mobility. With constant-voltage energization, the output current $I'$ is a function $V_o/q'$ of the supply voltage $V_o$ where $q'$ may be identical with $q$ or may differ from it because of a branching of the air flow between the two flow meters or because of the pre-ionizing effect of the first flow meter on the air reaching the second flow meter. In any event, the product $qq'$ is proportional to $V/I'$, or to $V/V'$ where $V'$ is a voltage derived from the output current $I'$ of the constant-voltage flow meter. Thus, either the quotient $V/V'$ or the difference $V-V'$ can be used as a measure of the deviation of the air resistance from a deviation value $q_o$ applying to the standard air composition. This deivation may therefore be utilized as a corrective variable for the output of the velocity-measuring flow meter, as by being fed to the condenser 27 of FIG. 3 in parallel with the signal from gate 23.

Figure 5:
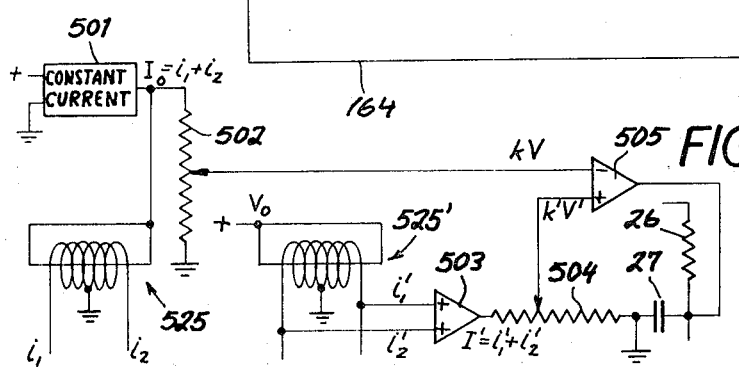
FIG. 5 is a circuit diagram illustrating a further feature of my invention.

This has been illustrated in FIG. 5 where a flow meter 525, of the same type as meter 125, is energized from a constant-current source 501 to develop the two measuring currents $i_1$ and $i_2$ (here assumed to be continuous) whose sum equals the output current $I_o$ of source 501. A potentiometer 502, connected across the flow meter 525, develops a voltage $kV$ proportional to the product $qI_o$ where $q$ is the apparent resistance between the anode and the cathode of the flow meter. Another such flow meter 525' has its anode energized with a constant voltage $V_o$ and has the extremities of its cathode, carrying currents $i_1'$ and $i_2'$, connected to a summing amplifier 503 delivering an output current $I'$ equal to their sum. Another potentiometer 504 traversed by currents $I'$ develops a voltage $k'V'$ proportional to current $I'$. The two voltages $k'V'$ and $kV$ are fed to respective inputs of a differential amplifier 505 whose output is constant as long as $k'V'-kV$ has a predetermined value which corresponds to normal air composition at the prevailing atmospheric pressure. If the air is contaminated so that the apparent resistances $q$ and $q'$ of flow meters 525 and 525' rise, the difference $k'V'-kV$ decreases and reduces the signal input to amplifier 28 (FIG. 3) in conformity with the lowered oxygen content of the combustion air entering the cylinder or cylinders.

With flow meter 525 generating the variable input signal for comparator 323, flow meter 525' may be used for supplying the timing pulses, or vice versa.

I claim:

1. A system for automatically dosing the amount of fuel introduced into a combustion chamber of an internal-combustion engine, comprising:
   an air-intake duct leading to said combustion chamber;
   a generator of timing pulses operatively coupled with the engine having an operating frequency proportional to engine speed;
   intermittently operable fuel-injection means communicating with said chamber;
   throttle means for varying the air flow in said duct;
   engine-controlled valve means between said duct and said chamber for periodically admitting air into same to form an explosive air/fuel mixture in said chamber;
   electronic flow-measuring means in said duct;
   timing means responsive to said pulses and to an output signal from said flow-measuring means for establishing a variable feeding period, depending upon the mass-flow rate of air through said duct, within a predetermined range of angular shaft positions; and
   actuating means for said fuel-injection means operated by said timing means during said feeding period;
   said flow-measuring means including a corona-effect ionization gauge provided with a thin anode wire extending along the axis of said duct, a pair of conductive tubes spacedly and coaxially surrounding said wire, said tubes having inner and outer diameters substantially greater than the wire diameter and being axially separated by a gap exposing an ion-emitting wire section of limited axial length, a cathode lining the wall of said duct, said cathode have an upstream portion and a downstream portion spacedly and coaxially surrounding said tubes, high-ohmic resistance means forming a ground connection for said tubes, and circuit means differentially connected to said upstream and downstream portions for producing said output signal.

2. A system as defined in claim 1 wherein said cathode comprises a helically wound conductor centered on the axis of said duct.

3. A system as defined in claim 2 wherein said anode is connected to said generator for periodic energization by said timing pulses.

4. A system as defined in claim 3 wherein said circuit means comprises a differential amplifier with two inputs capacitively coupled to said opposite ends and with an integrating output circuit for making said output signal proportional to the integrated value of metering pulses generated by the pulsating ion flow from said anode to said cathode.

5. A system as defined in claim 3 wherein said timing means comprises a bistable element connected to said generator for periodic setting by said timing pulses into a first operating condition, comparison means connected to said circuit means, and a supply of progressively varying reference potential connected to said comparison means for resetting said bistable means into a second operating condition upon said reference potential matching the magnitude of said output signal, said actuating means being connected to said bistable means for energization in one of said operating conditions thereof.

6. A system as defined in claim 5 wherein the connection between said comparison means and said output circuit includes a coupling circuit with thermosensitive resistance means disposed in the vicinity of said combustion chamber for modifying the magnitude of said output signal in accordance with engine temperature.

7. A system as defined in claim 1 wherein said flow-measuring means is disposed ahead of said valve means, said generator comprising second electronic flow-measuring means in said duct beyond said valve means responsive to a fluctuating air flow.

8. A system as defined in claim 1 wherein said flow-measuring means comprises a pair of cascaded flow meters each including anode and cathode means spacedly juxtaposed in said duct for generating an ion flow generally perpendicular to the duct axis and circuit means connected across one of said anode and cathode means for producing said output signal, a source of constant current for energizing the anode means of one of said flow meters, a source of constant voltage for energizing the anode means of the other of said flow meters, and differential circuitry connected across both cathode means for deriving therefrom a corrective variable for said output signal.

9. A system for automatically dosing the amount of fuel introduced into a combustion chamber of an internal-combustion engine, comprising:
   an air-intake duct leading to said combustion chamber;
   a generator of timing pulses operatively coupled with the engine having an operating frequency proportional to engine speed;

intermittently operable fuel-injection means communicating with said chamber;

throttle means for varying the air flow in said duct;

engine-controlled valve means between said duct and said chamber for periodically admitting air into same to form an explosive air/fuel mixture in said chamber;

electronic flow-measuring means in said duct;

timing means responsive to said pulses and to an output signal from said flow-measuring means for establishing a variable feeding period, depending upon the mass-flow rate of air through said duct, within a predetermined range of angular shaft positions; and actuating means for said fuel-injection means operated by said timing means during said feeding period;

said flow-measuring means including a corona-effect ionization gauge provided with an elongate anode centered on the axis of said duct and connected to said generator for periodic energization by said timing pulses, a cathode lining the wall of said duct and spacedly surrounding said anode, said cathode having an upstream portion and a downstream portion, and a differential amplifier connected across said upstream and downstream portions and provided with an integrating output circuit for producing an output signal proportional to the integrated value of metering pulses generated by the pulsating ion flow from said anode to said cathode;

said timing means including bistable means connected to said generator for periodic setting by said timing pulses into a first operating condition, comparison means with a first and a second input, a coupling circuit connecting said output circuit to said first input, thermosensitive resistance means in said coupling circuit disposed in the vicinity of said combustion chamber for modifying the magnitude of said output signal in accordance with engine temperature, and a supply of progressively varying reference potential connected to said setting input for resetting said bistable means into a second operating condition upon said reference potential matching the magnitude of said output signal, said actuating means being connected to said bistable means for energization in one of said operating conditions thereof.

10. A system as defined in claim 4 wherein said circuit means further comprises a normally blocked analog gate for said metering pulses connected to said generator for periodic unblocking by said timing pulses.

11. A system as defined in claim 5 wherein said supply of reference potential comprises a source of constant direct current, a condenser connected across said source for charging thereby, and switch means bridging said condenser and connected to said bistable means for closure in said second operating condition thereof to discharge said condenser, said actuating means being energizable by said bistable means in said first operating condition thereof.

12. A system for automatically dosing the amount of fuel introduced into a combustion chamber of an internal-combustion engine, comprising:

an air-intake duct leading to said combustion chamber;

a generator of timing pulses operatively coupled with the engine having an operating frequency proportional to engine speed;

intermittently operable fuel-injection means communicating with said chamber;

throttle means for varying the air flow in said duct;

engine-controlled valve means between said duct and said chamber for periodically admitting air into same to form an explosive air/fuel mixture in said chamber;

first electronic flow-measuring means in said duct ahead of said valve means, said generator including:

second electronic flow-measuring means in said duct beyond said valve means responsive to a fluctuating air flow;

timing means responsive to said pulses and to an output signal from said first flow-measuring means for establishing a variable feeding period, depending upon the mass-flow rate of air through said duct, within a predetermined range of angular shaft positions; and actuating means for said fuel-injection means operated by said timing means during said feeding period.

13. A system as defined in claim 7 wherein said engine has a plurality of cylinders and said duct forms an intake manifold for said cylinders, said combustion chamber being part of one of said cylinders, said second flow-measuring means being disposed close to the inlet of said one of said cylinders.

14. A system for automatically dosing the amount of fuel introduced into a combustion chamber of an internal-combustion engine, comprising:

an air-intake duct leading to said combustion chamber;

a generator of timing pulses operatively coupled with the engine having an operating frequency proportional to engine speed;

intermittently operable fuel-injection means communicating with said chamber;

throttle means for varying the air flow in said duct;

engine-controlled valve means between said duct and said chamber for periodically admitting air into same to form an explosive air/fuel mixture in said chamber;

electronic flow-measuring means in said duct;

timing means responsive to said pulses and to an output signal from said flow-measuring means for establishing a variable feeding period, depending upon the mass-flow rate of air through said duct, within a predetermined range of angular shaft positions; and actuating means for said fuel-injection means operated by said timing means during said feeding period;

said flow-measuring means comprising a pair of cascaded flow meters each including anode and cathode means spacedly juxtaposed in said duct for generating an ion flow generally perpendicular to the duct axis and circuit means connected across one of said anode and cathode means for producing said output signal, a source of constant current for energizing the anode means of one of said flow meters, a source of constant voltage for energizing the anode means of the other of said flow meters, and differential circuitry connected across both cathode means for deriving therefrom a corrective variable for said output signal.

* * * * *